(12) United States Patent
Kohler et al.

(10) Patent No.: US 6,618,702 B1
(45) Date of Patent: Sep. 9, 2003

(54) METHOD OF AND DEVICE FOR PHONE-BASED SPEAKER RECOGNITION

(76) Inventors: Mary Antoinette Kohler, 11528 Shell Flower La., Columbia, MD (US) 21044; Walter Doyle Andrews, III, 5968 Cecil Way, Eldersburg, MD (US) 21784; Joseph Paul Campbell, Jr., 49 Follen Rd., Lexington, MA (US) 02421-5921

( * ) Notice: Subject to any disclaimer, the term of this patent is extended or adjusted under 35 U.S.C. 154(b) by 0 days.

(21) Appl. No.: 10/064,155

(22) Filed: Jun. 14, 2002

(51) Int. Cl.$^7$ .......................... H04M 1/64; G10L 15/00; G10L 17/00
(52) U.S. Cl. ...................... 704/250; 704/231; 704/236; 704/251; 379/88.01
(58) Field of Search ........................... 379/88.01–88.04; 704/231, 236, 239, 240, 243, 246, 250, 251, 255, 257

(56) References Cited

U.S. PATENT DOCUMENTS 6,272,464 B1 * 8/2001 Kiraz et al. .................. 704/257
6,526,380 B1 * 2/2003 Thelen et al. ................ 704/251

OTHER PUBLICATIONS

Kohler, M.A. et al., Phonetic Speaker Recognition, Nov. 2001, Signals, Systems and Computers, 2001 Conference, vol. 2, INSPEC Accession No.: 7335610, pp. 1557–1561.*
Kohler, M.A., et al., Language Identification Using Shifted Delta Cepstra, 2002, Circuits and Systems, MWSCAS–2202, vol. 3, pp. 69–72.*
Andrews, W.D. et al., Gender–dependent Phonetic Refraction for Speaker Recognition, 2002, Acoustics, Speech, and Signal processing, 2002 (IEEE ICASSP '02), vol. 1, ISSN: 1520–6149, pp. I–149–I–152.*
Navratil, J. et al., Phonetic Speaker Recognition Using Maximum–likelihood Binary–decision Tree Models, 2003, Acoustics, Speech, and Signal Processing 2003 (IEEE ICASSP '03), vol. 4, ISSN: 1520–6149, pp. IV–796–IV–799.*
Hakkinen, J., N–gram and Decision Tree Based Language Identification for Written Words, 2001, Automatic Speech REcognition and Understanding 2001 (IEEE ASRU '01), INSPEC Accession No.: 7501176, pp. 335–338.*
Qin, Jin, Speaker Identification Using Multilingual Phone Strings, 2002, vol. 1, Acoustics, Speech, and Signal PRocessing, 2002 (IEEE ICASSP '02), ISSN: 1520–6149, pp. I–145–I–148.*

* cited by examiner

*Primary Examiner*—Roland G. Foster
(74) *Attorney, Agent, or Firm*—Stephen M. Bloor

(57) ABSTRACT

A language-independent speaker-recognition system based on parallel cumulative differences in dynamic realization of phonetic features ( i.e. , pronunciation) between speakers rather than spectral differences in voice quality. The system exploits phonetic information from many phone recognizers to perform text independent speaker recognition. A digitized speech signal from a speaker is converted to a sequence of phones by each phone recognizer. Each phone sequence is then modified based on the energy in the signal. The modified phone sequences are tokenized to produce phone n-grams that are compared against a speaker and a background model for each phone recognizer to produce log-likelihood ratio scores. The log-likelihood ratio scores from each phone recognizer are fused to produce a final recognition score for each speaker model. The recognition score for each speaker model is then evaluated to determine which of the modeled speakers, if any, produced the digitized speech signal.

15 Claims, 2 Drawing Sheets

METHOD OF AND DEVICE FOR PHONE-BASED SPEAKER RECOGNITION

BACKGROUND OF INVENTION

1. Field of the Invention

This invention relates generally to speaker recognition and more particularly to text-independent speaker identification over a large population.

2. Description of the Related Art

Speaker recognition technology has many uses including data mining and metadata for automated court, meeting, and lecture transcriptions. Speaker recognition technology can be used in real-time in concert with speech recognition to enhance broadcast closed-captioned features by providing the identity of the speaker along with the actual words spoken.

Traditional speech recognition and speaker verification use similar analysis tools to achieve their goals. An input utterance is first processed to determine its essential characteristics. Typically, input utterances are converted to cepstral coefficients. A cepstrum is an inverse Fourier transform of the log power spectrum. The cepstral coefficients for training utterances are saved in a training phase. This training set may consist only of short utterances of passwords for speaker verification systems to extensive vocabulary recitals for speech recognition. In speech recognition, an input utterance is compared to models based on saved training data to determine which utterance is most similar. In a generalized speech recognition system the saved training information must be a generalized representation of many people's way of forming an utterance while in speaker verification the training information represents the individual characteristics of the speaker and the verification system tries to determine if an authorized person's input utterance is sufficiently close to the training data and can be distinguished from an impostor's utterances. As a result, the training in a speaker verification system emphasizes individual characteristics, while in a speech recognition system the characteristics are generalized over many individual speakers.

Speaker recognition systems determine the identity of a conversational speaker. They typically do not have the advantage of being able to compare a short spoken password to the same short training data. In many ways speaker recognition systems share many of the attributes of speech recognition systems: the input samples and training data are not limited to simple verification phrases, there is little a priori knowledge of the input, the pace of speech is uncontrolled, and environmental effects, including the characteristics of the transmission device and media (telephone circuit, radio or broadcast channel), are unknown.

For example, one technique for speaker recognition would be to use speech recognition to capture the exact sequence of phones, examine the acoustic phonetic details of different speakers producing the same sounds and sequences of sounds, and compare these details across speakers or score them for each speaker against a model.

As an extreme example, given speakers A, B, and C, where speaker A lisps and speaker B stutters; then given perfect recognition of a large enough sample of speech by all three, the acoustic scores of the [s] and [sh] sounds might distinguish A from B and C, and either the acoustic scores or the Hidden Markov Model (HMM) path traversed by the initial stop consonants, for example, might distinguish B from C and A.

A problem with this approach is that speech recognizers are usually optimized for the recognition of words, not of phones; use word n-gram statistics to guide their decisions; and train their acoustic processing, model topologies, and time alignment to ignore speaker differences.

These very difficulties in speech recognition systems are in essence the differences in speakers—the differences that can be used for speaker recognition. Most practical methods of speaker recognition, and especially those with very limited training, are based on differences in broadly defined voice quality, rather than on these speaker differences. Individual speakers use different inventories of phones, or speech sounds. These cumulative differences in a speaker's pronunciation, represented by phones, can be exploited to recognize a speaker. Previous methods have used sequences of phonotactic constrained phonemes to extract and cluster acoustic features to recognize speakers or languages. There is a distinction between phonemes, defined by a language, as given by the dictionary, and phones, the actual pronunciation, as given by the acoustics. This invention exploits cumulative phone differences to identify the speaker. The dynamics of pronunciation contribute to human recognition of speakers, however, exploiting such information automatically is difficult because, in principle, comparisons must be made between different speakers saying essentially the same things.

What is needed is a tool that will consistently recognize and classify as many phonetic states as possible, regardless of their linguistic roles ( i.e., what words are being spoken), using sufficiently sensitive acoustic measurements, so that comparisons can be made among different speakers' realizations of the same speech gestures.

SUMMARY OF INVENTION

In consideration of the problems detailed above and the limitations enumerated in the partial solutions thereto, an object of the present invention is to provide an improved speaker recognition system using the phonetics of pronunciation.

Another object of the instant invention is to provide a speaker recognition system that operates independently of the text spoken, sex of the speaker, language used by the speaker, and audio characteristics of the input channel.

Another object of the instant invention is to provide a speaker recognition system that is not wholly dependent on acoustic measurements but relies on higher level speaker information.

Still another object of the instant invention is to provide a speaker recognition system that uses parallel streams of highly uncorrelated multi-lingual features.

Still another object of the instant invention is to provide a speaker recognition system that can exploit the long-term speaker characteristics associated with large amounts of training data.

Yet another object of the instant invention is to provide a speaker recognition system that makes use of n-gram modeling.

In order to attain the objectives described above, according to an aspect of the present invention, there is provided a method of and device for phone-based speaker recognition whereby speakers may be recognized and distinguished based on higher level speaker information and the cumulative differences of phonetic features of their voices.

The instant invention is a speaker-recognition system based only on phonetic sequences, instead of the traditional acoustic feature vectors. Although the phones are detected using acoustic feature vectors, the speaker recognition is performed strictly from the phonetic sequence created by the phone recognizer(s). Speaker recognition is performed using the outputs of one or more recognizers each trained on a different linguistic characteristic. Recognition of the same speech sample by these recognizers constitutes different views of the phonetic states and state sequences uttered by the speaker.

The instant system performs phonetic speaker recognition in four steps. First, a phone recognizer processes test speech utterance to produce phone sequences. Then a test speaker model is generated using phone n-gram counts. Next, the test speaker model is compared to the hypothesized speaker models and a background model. Finally, the scores from the hypothesized speaker models and background model are combined to form a single recognition score.

In some embodiments multiple-language phone sequences are accommodated by incorporating phone recognizers trained on several languages resulting in a matrix of hypothesized speaker models and background models.

The aforementioned features, objects, and advantages of this device and method over the prior art will become apparent to those skilled in the art from the following detailed description and accompanying drawings.

BRIEF DESCRIPTION OF DRAWINGS

Our invention can best be understood when reading the following specification with reference to the accompanying drawings, which are incorporated in and form a part of the specification, illustrate alternate embodiments of the present invention, and together with the description, serve to explain the principles of the invention. In the drawings.

DETAILED DESCRIPTION

Figure 1:
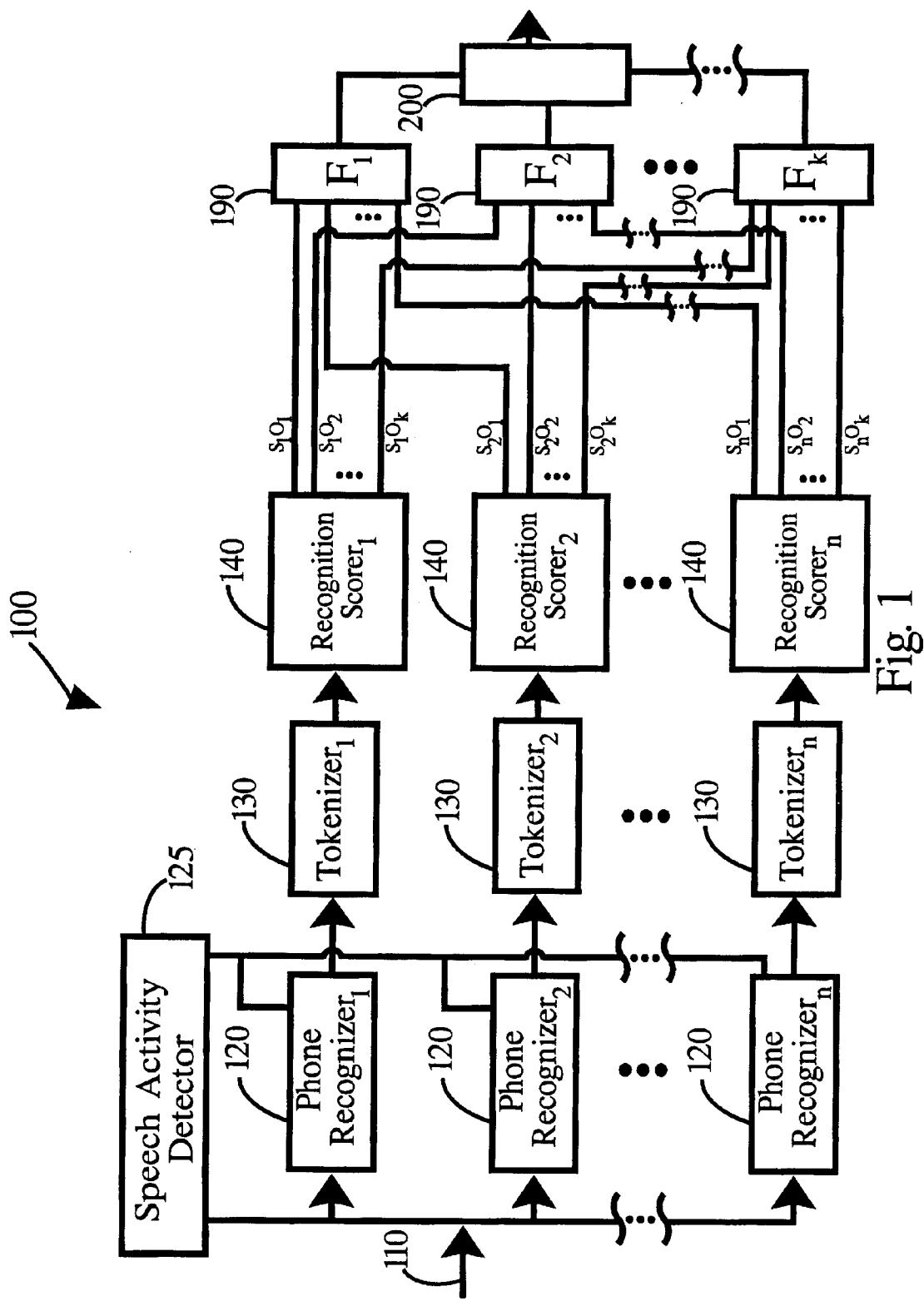
FIG. 1 is a schematic diagram showing one embodiment of the phone-based speaker recognition system.

FIG. 1 is a schematic block diagram of an exemplary phone-based speaker recognition system 100 (system 100). In this exemplar embodiment of the instant invention a digitized voice signal of the speaker to be identified is received at the voice input 110 and forwarded in parallel to one or more phone recognizers 120.

Each phone recognizer 120 converts the input digitized voice signal into a time ordered stream of phones representing the sounds produced by the speaker in the digitized voice signal. The phone recognizers 120 operate without phonotactic constraints, e.g., they do not impose any constraints on the order of the sounds. Each of the phone recognizers 120 is designed for one or more different linguistic characteristics, such as the language, sex, dialect, age, education, or social standing of the speaker. In the preferred embodiment the phone recognizers 120 are designed for different languages.

In some simple embodiments, where cost and complexity are factors, a system 100 with only one phone recognizer 120 may be employed. Such a system generally will not achieve the accuracy of a multiple phone recognizer 120 system 100 but may work sufficiently well where there is little variation in linguistic characteristics among the speakers to be identified.

Various phone recognizers 120 are well known in the art and any meeting the functionality described above may be employed in the instant system 100. In the preferred embodiment the phone recognizers 120 used by the Parallel Phone Recognition with Language Modeling (PPRLM) language identification system are used for creating the time ordered stream of phones. These phone recognizers 120 calculate twelve cepstral ($c'_1$–$C'_{12}$) and thirteen delta-cepstral ($c'_0$–$c'_{12}$) features on 20 ms frames with 10 ms updates. The cepstral and delta-cepstra are sent as two independent streams to fully connected, three-state, null-grammar Hidden Markov Models (HMM). They use a Viterbi HMM decoder implemented with a modified version of the Cambridge University HMM Toolkit. The output probability densities for each observation stream (cepstra and delta-cepstra) in each state are modeled as six univariate Gaussian densities.

In the preferred embodiment the digitized voice signal of the speaker to be identified on voice input is also forwarded in parallel to a speech activity detector 125 where the presence of speech is detected. The speech activity detector 125 signals the phone recognizers to change any corresponding phones in the time ordered stream of phones to silence tags when no speech is identified throughout the phone's duration. This eliminates erroneous phones caused by spurious input signal noise.

In the preferred embodiment a start tag is inserted at the beginning and a stop tag is inserted at the end of each time ordered stream of phones. Additionally, each silence phone and each consecutive stream of silence phones in the time ordered stream of phones are replaced with a stop and start tag pair thus creating a modified time ordered stream of phones.

Each time ordered stream of phones, or in the preferred embodiment, modified time ordered stream of phones, hereinafter "phone stream," is transmitted to a corresponding tokenizer 130. Each tokenizer 130 receives the phone stream and creates a set containing all phone n-grams in the phone stream and the number of times each phone n-gram occurred. The number of phones used in the n-gram pattern is defined by n where n is a positive integer, and patterns with more than one value of n can be collected. In the simplest embodiment, where n=1, assaying the phone unigrams is the only task of the tokenizer 130. In the preferred embodiment, where n=3, the tokenizer 130 must assemble and assay existing phone tri-grams.

Figure 2:
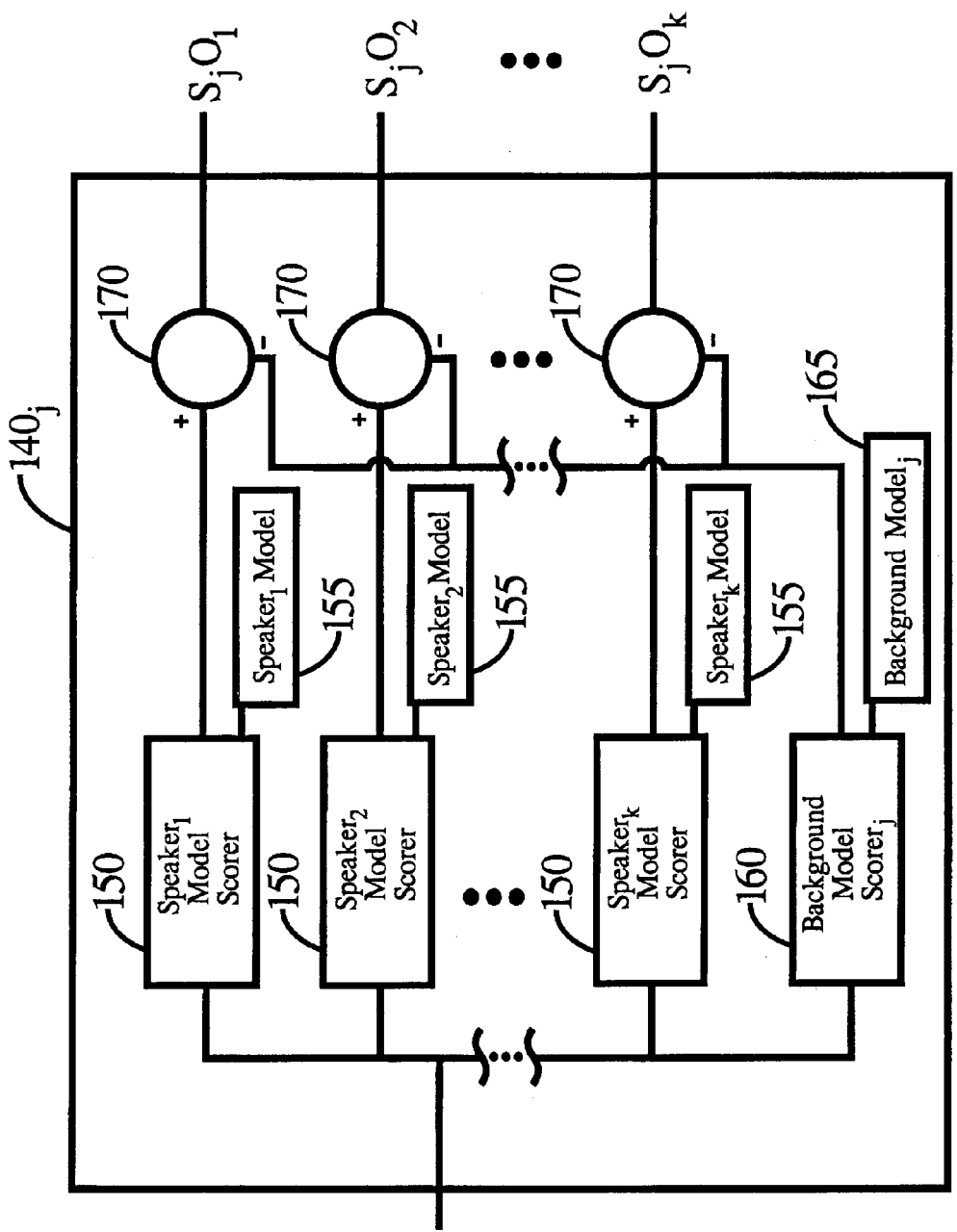
FIG. 2 is a schematic diagram of a recognition scorer in a device for phone-based speaker recognition.

Each tokenizer 130 output is in turn received by a corresponding recognition scorer 140. As shown in FIG. 2 the phone n-gram set is transmitted to one or more speaker model scorers 150 and the background model scorer 160 in the corresponding recognition scorer 140.

Each speaker model scorer 150 computes a speaker log-likelihood score using a speaker model 155 for each phone n-gram in the phone stream. This score is an estimate of the possibility that the phone n-gram p was produced by the speaker represented by the speaker model 155. In the preferred embodiment, the speaker log-likelihood score is calculated using $$S_i(p) = \log\left[\frac{H_i(p)}{N_{H_i}}\right],$$

where $S_i(p)$ is the speaker log-likelihood score for phone n-gram p for speaker i, $H_i(p)$ is the number of occurrences of phone n-gram p for speaker i as found in its speaker model 155, and $N_{H_i}$ is the total number of phone n-grams for speaker i.

The speaker model 155 contains the number of occurrences of each phone n-gram that occurred in the speaker training speech set collected from a particular speaker. The speaker model 155 is created by passing the speaker training speech set through the phone recognizer 120, speech activity detector 125, and tokenizer 130. The phone n-grams created by the tokenizer 130 are counted and stored in the speaker model 155. Speaker recognition performance can be increased by ignoring infrequent and too frequent phone n-grams in the speaker model 155.

Each background model scorer 160 computes a background log-likelihood score using a background model 165 for each phone n-gram in the phone stream. This score is an estimate of the possibility that the phone n-gram p was produced by a set of background speakers represented by the background model 165. In the preferred embodiment, the log-likelihood score is calculated using $$B(p) = \log\left[\frac{U(p)}{N_U}\right],$$

where, B(p) is the log-likelihood score for phone n-gram p for the background model, U(p) is the number of occurrences of phone n-gram p for a set of background speakers as found in background model 165, and $N_U$ is the total number of phone n-grams for the background model.

The background model 165 contains the number of occurrences of each phone n-gram that occurred in the background training speech set collected from many speakers, excluding all speakers to be recognized. The background model 165 is created by passing the background training speech set through the phone recognizer 120, speech activity detector 125, and tokenizer 130. The phone n-grams created by the tokenizer 130 are counted and stored in the background model 165. Speaker recognition performance can be increased by ignoring infrequent and too frequent phone n-grams in the background model 165.

The ratio scorer 170 combines the speaker log-likelihood score from the speaker model scorer 150 and the background log-likelihood score from the background model scorer 160 to produce a log-likelihood ratio. In the preferred embodiment, the log likelihood ratio is calculated using $$\eta_i = \frac{\sum_P (w(p)[S_i(p) - B(p)])}{\sum_P w(p)},$$

where $S_i(p)$ is the log-likelihood score for phone n-gram p for speaker i, B(p) is the log-likelihood score for phone n-gram p for the background model, and w(p) is a weighting function. In the preferred embodiment, the weighting function is calculating using $w(p)=cp)^{1-d}$, where, c(p) is the number of phone n-grams occurring in the digitized voice signal of the speaker to be identified, and d is a discounting factor ranging from 0.0 to 1.0. When d=1 all phone n-grams occurring in the phone stream are weighted equally. When d=0, each phone n-gram is weighted by the number of times it occurs in the phone stream. In the preferred embodiment, d=1.

The recognition scorers 140 produces a set of k log-likelihood ratio scores, one for each speaker model 155 and corresponding to its phone recognizer. These scores are passed to the fusion scorer 190 where the specific speaker log-likelihood ratio scores from each precognition scorers 140 are combined to form a single speaker score. In the simplest embodiment, the log-likelihood ratio score produced from a single phone recognizer 120, tokenizer 130, and recognition scorer 140 is the output of the fusion scorer 190. In the preferred embodiment, log-likelihood ratio scores created from multiple phone recognizers 120, tokenizers 130, and recognition scorers 140 are combined to form a final recognition score in fusion scorer 190. A simple fusion sums each equally-weighted log-likelihood ratio score. In the preferred embodiment, the fusion is a non-linear combination utilizing a Gaussian mixture model with k-means clustering.

Each score output from fusion scorer 190 is passed to speaker selector 200. The speaker selector 200 evaluates the k scores from fusion scorers 190 to either select a single speaker or reject all modeled speakers. In the preferred embodiment, the largest fusion score greater than a pre-defined threshold determines the speaker selected. I f the largest fusion score does not exceed the threshold then all possible modeled speakers are rejected.

Although various preferred embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. A device for phone-based speaker recognition, comprising:

at least one phone recognizer for converting input digitized voice signals into a time ordered stream of phones based on at least one linguistic characteristic, with each of said phone recognizers having a voice input, to receive said input digitized voice signals, and an output for transmitting said time ordered stream of phones;

for each of said phone recognizers, a corresponding tokenizer, having an input for receiving said time ordered stream of phones, with each of said tokenizers creating a set containing phone n-grams and the number of times each of said phone n-grams occurred in said time ordered stream of phones, and having an output for transmitting said set containing phone n-grams and the number of times each of said phone n-grams occurred;

for each of said tokenizers, a corresponding recognition scorer further comprising:

(a) at least one speaker model scorer, each of said speaker model scorers receives the corresponding set containing phone n-grams and the number of times each of said phone n-grams occurred in said time ordered stream of phones and computes a speaker log-likelihood score for each of said phone n-grams in said set containing phone n-grams and the number of times each of said phone n-grams occurred in said time ordered stream of phones using a corresponding speaker model which contains the number of occurrences of each of said phone n-grams that occurred in a speaker training speech set collected from a particular speaker;

(b) a background model scorer for computing a background log-likelihood score for each of said phone n-grams in said set containing phone n-grams and the number of times each of said phone n-grams occurred in said time ordered stream of phones using a corresponding backgrounds model which contains the number of occurrences of each of said phone n-grams that occurred in background training speech set collected from many speakers, excluding all of said particular speakers; and (c) for each of said speaker model scorers, a ratio scorer that produces a speaker log-likelihood ratio from said speaker log-likelihood score and said background log-likelihood score;

for each of said recognition scorers, a corresponding fusion scorer which combines all of said corresponding speaker log-likelihood ratios from said corresponding ratio scorers to produce a single speaker score; and a speaker selector which evaluates all of said single speaker scores to determine a speaker identity for the speaker of said input digitized voice signals.

2. The device of claim 1 further comprising a speech activity detector having an input to receive said input digitized voice signals in parallel with said phone recognizers, wherein said speech activity detector detects the absence of speech in said input digitized voice signals and provides a no-speech signal to said phone recognizers when said absence of speech is detected and wherein said phones in said time ordered stream of phones are set to silence tags by said phone recognizers when said no-speech signal is received.

3. The device of claim 1 wherein at least one of said linguistic characteristics is the language spoken by the speaker of said input digitized voice signal.

4. The device of claim 1 wherein at least one of said linguistic characteristics is the sex of the speaker of said input digitized voice signal.

5. The device of claim 1 wherein at least one of said linguistic characteristics is the dialect spoken by the speaker of said input digitized voice signal.

6. The device of claim 1 wherein at least one of said linguistic characteristics is the age of the speaker of said input digitized voice signal.

7. The device of claim 1 wherein at least one of said linguistic characteristics is the education of the speaker of said input digitized voice signal.

8. The device of claim 1 wherein at least one of said linguistic characteristics is the social standing of the speaker of said input digitized voice signal.

9. The device of claim 1 wherein said phone recognizers insert a start tag at the beginning of, and a stop tag at the end of, each of said time ordered stream of phones.

10. The device of claim 2 wherein said phone recognizers replace each consecutive string of at least one of said silence tags by a stop and start tag pair.

11. The device of claim 1 wherein said set containing phone n-grams and the number of times each of said phone n-grams occurred in said time ordered stream of phones contains only n-grams where n is equal to a single positive integer.

12. The device of claim 1 wherein said set containing phone n-grams and the number of times each of said phone n-grams occurred in said time ordered stream of phones contains only n-grams where n is equal to one.

13. The device of claim 1 wherein each of said speaker log-likelihood ratios is modified by a weighting function wherein said weighting function is dependent on the number of times a particular of said phones is found in said time ordered stream of phones.

14. The device of claim 1 wherein said each of said corresponding fusion scorer use a Gaussian mixture model with k-means clustering to produce said single speaker score.

15. A method of phone-based speaker recognition, comprising the steps of:

converting input digitized voice signals into at least one time ordered stream of phones with each of said time ordered stream of phones based on at least one linguistic characteristic;

creating a set containing phone n-grams and the number of times each of said phone n-grams occurred in each of said time ordered stream of phones;

computing a speaker log-likelihood score for each of at least one possible particular speaker for each of said phone n-grams in said set containing phone n-grams and the number of times each of said phone n-grams occurred in said time ordered stream of phones using a corresponding particular speaker model which contains the number of occurrences of each of said phone n-grams that occurred in a speaker training speech set collected from the particular speaker;

computing a background log-likelihood score for each of said phone n-grams in said set containing phone n-grams and the number of times each of said phone n-grams occurred in said time ordered stream of phones using a corresponding backgrounds model which contains the number of occurrences of each of said phone n-grams that occurred in background training speech set collected from many speakers, excluding all of said particular speakers;

producing a speaker log-likelihood ratio from each of said speaker log-likelihood scores and said background log-likelihood scores;

combining all of said corresponding speaker log-likelihood ratios to produce a single speaker score; and determining a speaker identity based on an evaluation of all of said single speaker scores.

* * * * *